United States Patent
Williamson et al.

(10) Patent No.: US 9,898,071 B2
(45) Date of Patent: Feb. 20, 2018

(54) PROCESSOR INCLUDING MULTIPLE DISSIMILAR PROCESSOR CORES

(71) Applicant: Apple Inc., Cupertino, CA (US)

(72) Inventors: David J. Williamson, Austin, TX (US); Gerard R. Williams, III, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 191 days.

(21) Appl. No.: 14/548,872

(22) Filed: Nov. 20, 2014

(65) Prior Publication Data
US 2016/0147289 A1 May 26, 2016

(51) Int. Cl.
G06F 1/32 (2006.01)
G06F 9/46 (2006.01)

(52) U.S. Cl.
CPC .......... *G06F 1/3293* (2013.01); *G06F 1/3206* (2013.01); *G06F 1/3234* (2013.01); *G06F 1/3287* (2013.01); *G06F 1/3296* (2013.01); *G06F 9/461* (2013.01); *Y02B 60/1285* (2013.01)

(58) Field of Classification Search
None
See application file for complete search history.

(56) References Cited

U.S. PATENT DOCUMENTS 7,281,055 B2 10/2007 Glasco et al.
7,409,506 B2 8/2008 Kamigata et al.
7,624,250 B2 11/2009 Lau et al.
8,301,932 B2 10/2012 Hay et al.
8,533,505 B2 9/2013 Greenhalgh
(Continued)

FOREIGN PATENT DOCUMENTS

EP 2784674 10/2014
TW 201418972 A 5/2014
(Continued)

OTHER PUBLICATIONS

International Search Report and Written Opinion in application No. PCT/US2015/054993 dated Mar. 2, 2016.
(Continued)

*Primary Examiner* — Nitin Patel
*Assistant Examiner* — Danny Chan
(74) *Attorney, Agent, or Firm* — Meyertons, Hood, Kivlin, Kowert & Goetzel, P.C.; Lawrence J. Merkel

(57) ABSTRACT

In an embodiment, an integrated circuit may include one or more processors. Each processor may include multiple processor cores, and each core has a different design/implementation and performance level. For example, a core may be implemented for high performance, but may have higher minimum voltage at which it operates correctly. Another core may be implemented at a lower maximum performance, but may be optimized for efficiency and may operate correctly at a lower minimum voltage. The processor may support multiple processor states (PStates). Each PState may specify an operating point and may be mapped to one of the processor cores. During operation, one of the cores is active: the core to which the current PState is mapped. If a new PState is selected and is mapped to a different core, the processor may automatically context switch the processor state to the newly-selected core and may begin execution on that core.

20 Claims, 6 Drawing Sheets

(56) References Cited

U.S. PATENT DOCUMENTS

| | | | |
|---|---|---|---|
| 8,751,833 B2 | 6/2014 | Hill | |
| 8,793,686 B2 | 7/2014 | Aasheim | |
| 8,819,686 B2 | 8/2014 | Memik et al. | |
| 2008/0263324 A1* | 10/2008 | Sutardja | G06F 1/3203 712/43 |
| 2008/0276026 A1* | 11/2008 | Branover | G06F 1/324 710/260 |
| 2008/0307422 A1 | 12/2008 | Kurland et al. | |
| 2009/0172713 A1 | 7/2009 | Kim | |
| 2010/0153954 A1* | 6/2010 | Morrow | G06F 1/329 718/102 |
| 2010/0169609 A1* | 7/2010 | Finkelstein | G06F 1/3203 712/43 |
| 2011/0213934 A1* | 9/2011 | Greenhalgh | G06F 1/3293 711/146 |
| 2011/0213935 A1 | 9/2011 | Greenhalgh et al. | |
| 2011/0271126 A1 | 11/2011 | Hill | |
| 2012/0233477 A1 | 9/2012 | Wu et al. | |
| 2012/0254877 A1 | 10/2012 | Comparan et al. | |
| 2013/0061237 A1* | 3/2013 | Zaarur | G06F 9/4856 718/105 |
| 2013/0268742 A1 | 10/2013 | Yamada | |
| 2013/0346058 A1 | 12/2013 | Beckmann | |
| 2014/0019723 A1 | 1/2014 | Yamada | |
| 2014/0095910 A1* | 4/2014 | Conrad | G06F 13/00 713/323 |
| 2014/0129808 A1 | 5/2014 | Naveh et al. | |
| 2014/0173311 A1 | 6/2014 | Park et al. | |
| 2014/0181501 A1* | 6/2014 | Hicok | G06F 9/5094 713/100 |
| 2014/0298060 A1* | 10/2014 | Hooker | G06F 1/3293 713/323 |
| 2015/0007196 A1 | 1/2015 | Toll et al. | |
| 2015/0058650 A1* | 2/2015 | Varma | G06F 1/3293 713/324 |
| 2015/0121105 A1* | 4/2015 | Ahn | G06F 1/3293 713/322 |
| 2015/0286262 A1* | 10/2015 | Park | G05D 23/1917 713/320 |
| 2015/0378417 A1 | 12/2015 | Lim | |
| 2016/0154649 A1 | 6/2016 | Lin et al. | |

FOREIGN PATENT DOCUMENTS

| | | |
|---|---|---|
| TW | 201437912 A | 10/2014 |
| WO | 2009-029643 | 3/2009 |
| WO | 2013/036222 | 3/2013 |
| WO | 2013/100996 | 7/2013 |
| WO | 2013/101069 | 7/2013 |

OTHER PUBLICATIONS

Taiwan (ROC) Patent Application No. 104135131, Search Report, dated Jul. 26, 2016.

U.S. Appl. No. 14/844,212, filed Sep. 3, 2015, Hardage et al.

"Emulating Asymmetric MPSoCs on the Intel SCC Many-core Processor", Roy Bakker, et al., Feb. 2014, pp. 1-8.

"Benefits of the big. LITTLE Architecutre", Hyun-Duk Cho, et al., Feb. 2012, Samsung Electronics, pp. 1-8.

"big.LITTLE Processing", ARM, accessed Jan. 14, 2014, pp. 1-4.

"Reflex: Using Low-Power Processors in Smartphones without Knowing Them", Felix Xiaozhu Lin, et al., Mar. 2012, pp. 1-12.

"Variable SMP—A Multi-Core CPU Architecture for Low Power and High Performance", nvidia, 2011, pp. 1-16.

"A HW/SW Co-designed Heterogeneous Multi-core Virtual Machine for Energy-Efficient General Purpose Computing", Youfeng Wu, et al., Apr. 2011, pp. 1-10.

"Distributed Thermal Management for Embedded Heterogeneous MPSoCs with Dedicated Hardware Accelerators", Yen-Kuan Wu, et al., Oct. 2011, pp. 1-7.

U.S. Appl. No. 14/548,912, filed Nov. 20, 2014, David J. Williamson.

Office Action, U.S. Appl. No. 14/548,912, filed Nov. 20, 2014, dated Sep. 9, 2016, 21 pages.

Office Action, U.S. Appl. No. 14/548,912, filed Nov. 20, 2014, dated Feb. 1, 2017, 15 pages.

IPRP, Written Opinion, PCT/US2015/054993, dated Jun. 1, 2017, 8 pages.

Office action, U.S. Appl. No. 14/844,212, dated Jun. 2, 2017, 18 pages.

\* cited by examiner

PROCESSOR INCLUDING MULTIPLE DISSIMILAR PROCESSOR CORES

BACKGROUND

Technical Field

Embodiments described herein are related to processors and, more particularly, to multiple processor cores forming a processor.

Description of the Related Art

Various processors are included in electronic systems to execute software providing some amount of user functionality. The processors may include the central processing units (CPUs) in the system, as well as special purpose processors dedicated to specific tasks such as graphics, media processing, etc. Generally, the processors are designed to operate at multiple operating points (settings of supply voltage magnitude and clock frequency). Lower operating points consume less power but also offer limited performance compared to higher operating points. For some workloads, the limited performance is sufficient and the lower operating points can be used. For other workloads, the higher operating points are needed to provide sufficient performance.

In some systems, a wide diversity of workloads are experienced. Designing a processor that can provide the performance needed by the most demanding workloads while also supporting the lowest possible operating point that would provide sufficient performance for many frequently-executed workloads has become a challenge. Processors that operate at high operating points may only support a reduction in supply voltage to a certain level before circuitry ceases to function correctly. Compromises must be made, and typically the lowest operating point is increased until the design can meet the desired high end operating point. As the high end operating points continue to increase, more and more workloads are executable at the lowest operating point (and many could be executed at even lower operating points). Power is expended unnecessarily for such workloads, which can be a critical factor in mobile systems that frequently operate on a limited energy source such as a battery.

SUMMARY

In an embodiment, an integrated circuit may include one or more processors. Each processor may include multiple processor cores, and each core has a different design/implementation and performance level. For example, a core may be implemented for high performance, but may have higher minimum voltage at which it operates correctly. Another core may be implemented at a lower maximum performance, but may be optimized for efficiency and may operate correctly at a lower minimum voltage. The processor may support multiple processor states (PStates). Each PState may specify an operating point (e.g. a combination of supply voltage magnitude and clock frequency), and each PState may be mapped to one of the processor cores. During operation, one of the cores is active: the core to which the current PState is mapped. If a new PState is selected and is mapped to a different core, the processor may automatically context switch the processor state to the newly-selected core and may begin execution on that core.

In an embodiment, the multiple cores may permit the processor to support a wide range of PStates and/or may provide for improved power efficiency, particularly at lower PStates. The processor may support enhanced battery life (e.g. in mobile systems). The processor may provide for efficient execution for workloads that are not as performance-demanding, which may lessen thermal demands in various systems.

BRIEF DESCRIPTION OF THE DRAWINGS

The following detailed description makes reference to the accompanying drawings, which are now briefly described.

Figure 1:
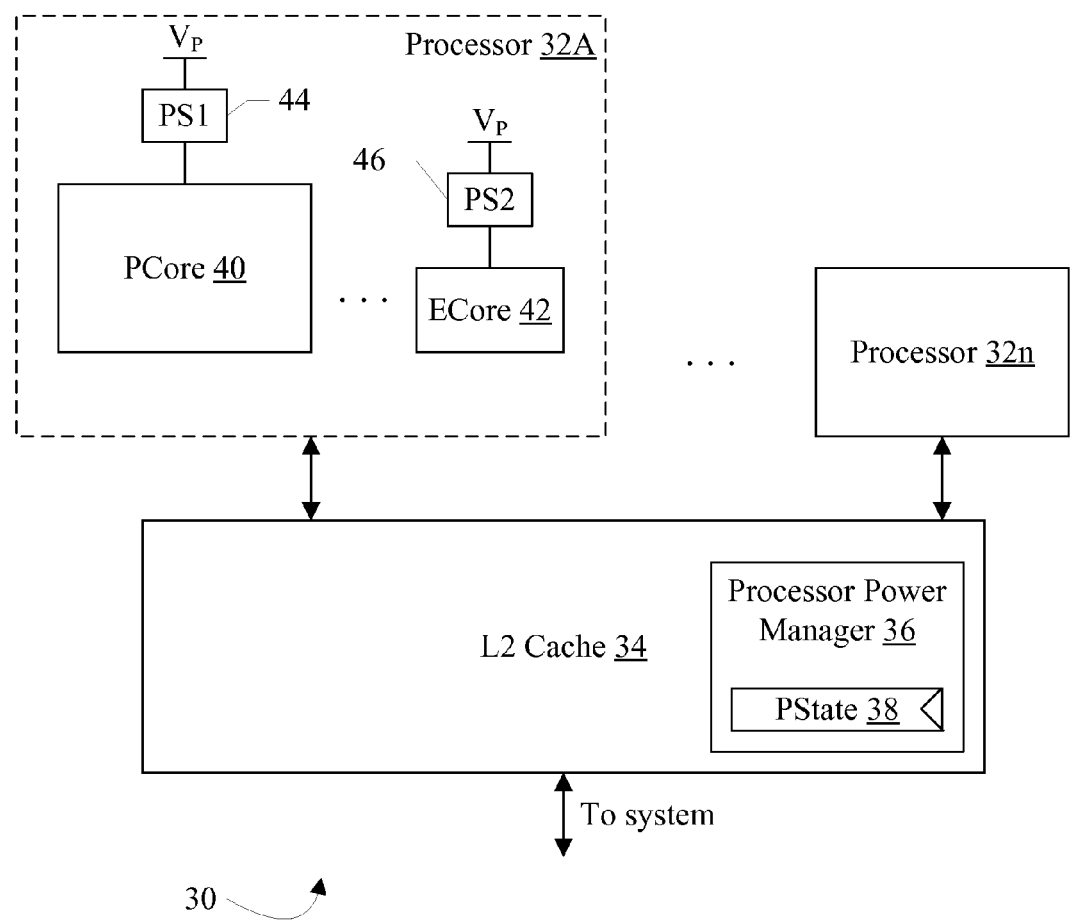
FIG. 1 is a block diagram of one embodiment of a processor cluster.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112(f) interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

FIG. 1 is a block diagram of one embodiment of a processor cluster 30. In the illustrated embodiment, multiple processors 32A-32n and a level 2 (L2) cache 34 are included. The processors 32A-32n are coupled to the L2 cache 34, which is further coupled to communicate with other elements of a system that includes the cluster 30. In the illustrated embodiment, the L2 cache 34 includes a processor power manager 36 that includes a PState register 38 storing a PState for the processors 32A-32n. Each processor 32A-32n may have its own independent PState, groups of processors 32A-32n may share a PState, or the cluster 30 may have a shared PState for the processors 32A-32n, in various embodiments. Processor 32A is shown in more detail in FIG. 1 to include at least two processor cores, a performance core (PCore) 40 and an efficient core (ECore) 42. Other embodiments may include additional cores. Each core 40 and 42 is coupled to a power supply rail ($V_P$) through respective power switches 44 and 46. Thus, each core 40 and 42 may be independently powered up or down. Other processors, such as the processor 32n, may be similar to the processor 32A.

Each processor 32A-32n may be an entity to which software executing in the system may assign code to execute. For example, the software may be part of an operating system (OS) that controls the hardware in the system. The software may be a thread or task scheduler which schedules code to be executed. The OS may also assign a PState to the processors 32A-32n, based on the performance demands of the code being executed. The OS may track the behavior of the code to determine PStates, may statically record information for each thread/task to select a PState, etc., or any combination thereof. In addition or alternatively, the PState may be affected by other conditions in the system (thermal limits, battery power available, etc.).

Each possible PState may specify an operating point for a processor 32A-32n. For example, the operating point may include a supply voltage magnitude for $V_P$ and a clock frequency for the clocks in the processor 32A-32n. Other embodiments may define the operating point in other fashions, but generally the operating point may indicate the performance and power consumption of the processor. In an embodiment, the PState may be a pair of values that are directly used as the supply voltage magnitude and the clock frequency. In other embodiments, the PState may be a value that is used to obtain the supply voltage magnitude and the clock frequency (e.g. an index into a table of values).

As illustrated in FIG. 1, the processor 32A includes the PCore 40 and the ECore 42. Each PState that is supported by the processor 32A is mapped to one of the cores 40 and 42. Each core 40 and 42 may have more than one PState mapped to it.

As the code being executed by a processor 32A-32n changes and/or other system considerations warrant a change in the PState, the PState register 38 may be updated (e.g. by the OS). If the PState is changed from a current PState that is mapped to one of the cores 40 and 42 (the "active core") to a new PState that is mapped to another one of the cores 40 and 42 (the "target core"), the cluster 30 may automatically, in hardware, transfer the processor context of the processor 32A from the active core to the target core. The target core may be powered off at the time the PState is changed. The process of transferring the context may include powering on the target core, resetting and initializing the target core, transferring the processor context, and powering off the active core (making the target core the active core). Execution may continue on the target core (now active core). Accordingly, switching between cores may be invisible to software. In fact, software may not even be "aware" that there are multiple cores in the processor 32A-32n. In an embodiment, the cores 40 and 42 may have different implementations, but may provide precisely the same program behavior in response to any given instruction stream, including privileged instructions. For example, some instruction set architectures may include features that would uniquely identify a processor in a system. For example, instruction set architectures often have a "CPU ID" instruction that returns a value assigned to the CPU in the system. Each CPU in the system is assigned a unique value. Both cores 40 and 42 may return the same CPU ID value. Another form of the CPU ID instruction may return a value indicating which optional features of the instruction set architecture are implemented by the processor. Both cores 40 and 42 may return the same value for that instruction as well. Various model-specific registers may be provided that may vary from implementation to implementation. The model-specific register implementation of the cores 40 and 42 may be the same. Thus, the software that executes on the processors 32A-32B, including the operating system software, application software, etc., may operate identically independent of which core 40 or 42 is active.

The PCore 40 and the ECore 42 may be different designs, different implementations of an instruction set architecture (ISA) employed by the processors 32A-32n. Viewed in another way, the PCore 40 and the ECore 42 may implement different microarchitectures. The PCore 40 may be an aggressive design that attempts to maximize performance with power conservation as a less-emphasized design goal. The circuitry in the PCore 40 may be aggressive, which may prevent the minimum supply voltage at which the PCore 40 may operate from being as low as may be desired in some of the PStates. On the other hand, the ECore 42 may implement a more conservative design, and thus may operate correctly at lower minimum voltages than the PCore 40. The performance of the ECore 42 may be lower than the PCore 40 at a given operating point, and power conservation may be a more highly-emphasized goal for the ECore 42. The semiconductor area occupied by the ECore 42 may be less than that of the PCore 40 as well.

While the example illustrated in FIG. 1 includes two cores in the processor 32A, other embodiments may include more than two cores. One core may be the most efficient core operating at the lowest PStates, and other cores may be optimized for other points along the performance/efficiency spectrum until yet another core is the highest performance core of the multiple cores in the processor. Any number of cores may be used in various embodiments.

Generally, a processor may be any circuitry configured to implement a defined instruction set architecture (ISA). Various ISAs exist and may be used in various embodiments, such as the x86 architecture (also known as APX), the ARM architecture, the MIPS architecture, PowerPC (now simply Power), etc. A variety of microarchitectural techniques may be employed by the processor, including the multiple core approach described above. Each core may implement various microarchitectural techniques as well. Generally, the microarchitecture may refer to the organization of execution units and other circuitry that is used to implement the ISA. Examples may include in-order versus out-of-order execution, speculative execution, branch prediction, superscalar, superpipelined, etc. Embodiments may implement microcoding techniques in addition to various other techniques.

The processors 32A-32n and/or the processor complex 30 may be used as any processors in a system. For example, the processors may be central processing units (CPU) that execute the OS to control other hardware in the system and schedule application code to be executed. The CPU may execute the application code as well, etc. The processors may be special purpose processors such as graphics processing units (GPU) optimized for graphics manipulations, digital signal processors (DSPs) optimized for signal processing, embedded processors performing software execution in various peripheral components, etc.

In an embodiment, at most one of the cores 40 and 42 forming a processor 32A-32n may be powered on during execution, except for times when the processor context is being transferred. A given processor 32A-32n may be completely off (all cores powered down). The processor power manager 36 may be configured to control the powering on/up of the processor cores and powering off/down of the processor cores using the power switches 44 and 46.

In some embodiments, the cores 40 and/or 42 may implement data caches that may store modified data (i.e. data that has been written in the cache, e.g. responsive to stores in the processor code being executed, but that has not been written to memory yet such that the data in memory is no longer the correct data). In addition to transferring processor context, the modified data may be flushed from the data cache. Particularly, the data may be flushed to the L2 cache 34, but may remain stored in the L2 cache 34 unless normal operation of the L2 cache 34 causes the data to be evicted. Once the newly-active core is executing, modified data may be a hit in the L2 cache 34 and may be moved into the newly-active core's cache with relatively low latency.

The processor power manager 36 may be configured to manage PState transitions within the processor cluster 30. The processor power manager 36 may be configured to communicate supply voltage magnitude transitions to a system level power manager or directly to a power management unit (PMU) that supplies the voltages to the system. The processor power manager 36 may be configured to interact with the clock generation hardware (not shown in FIG. 1) such as a phase lock loop (PLL) or the like.

The processor context may generally include any software-visible processor state. The state may typically be stored in registers accessible as operands of various instructions defined in the ISA. The state may include architected registers such as the operand registers of various types (integer, floating point, vector, etc.). The registers may also include processor control registers such as status registers, processor mode registers, etc. The registers may also include special purpose registers defined to include specific content for a specific unit. The registers may further include model specific registers, whose existence may be architecturally specified but whose contents may vary from implementation to implementation.

The L2 cache 34 may have any capacity and configuration. The L2 cache 34 may be inclusive of caches in the processors 32A-32n, exclusive of the caches, or non-inclusive.

Figure 2:
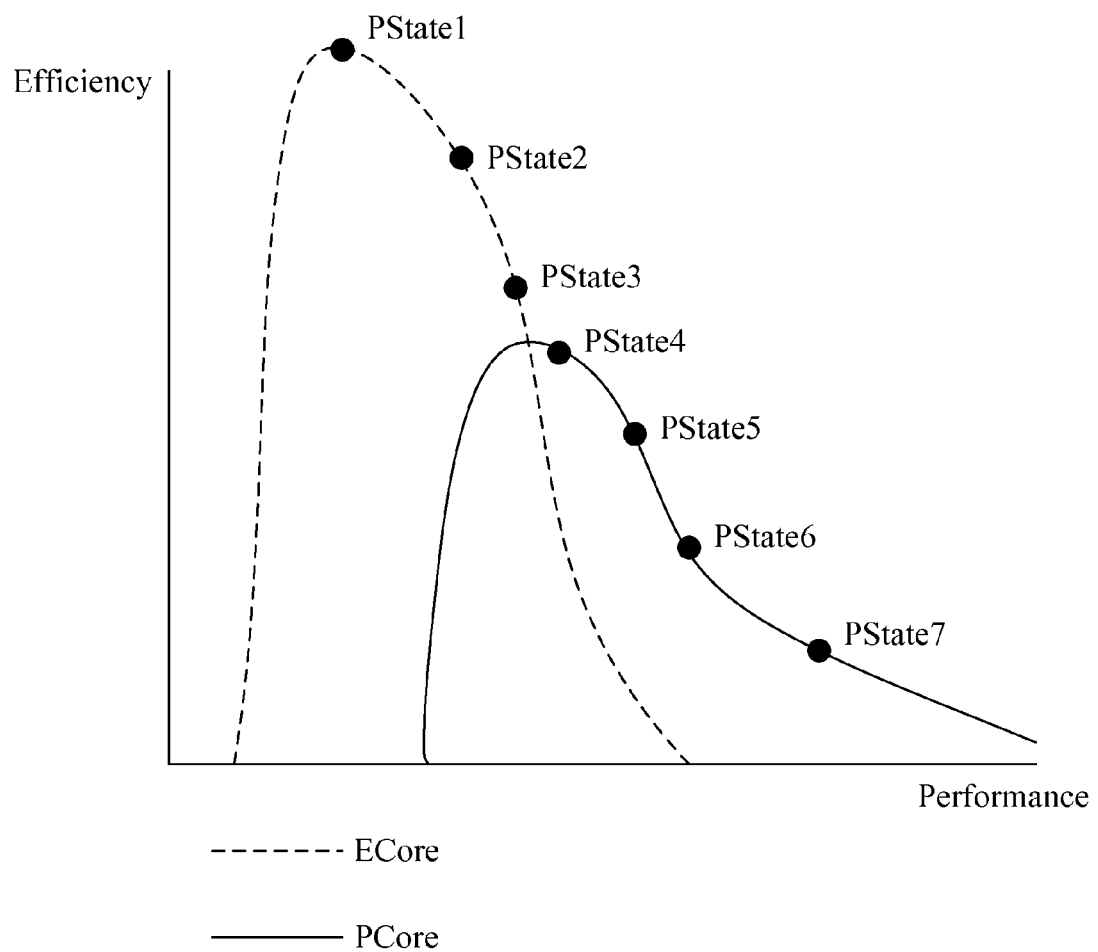
FIG. 2 is a graph illustrating efficiency versus performance for a PCore and an ECore as illustrated in FIG. 1 for one embodiment.

FIG. 2 is a graph illustrating efficiency versus performance for one embodiment of the cores 40 and 42. The dotted curve corresponds to the ECore 42 and the solid line corresponds to the PCore 40. Efficiency is graphed on the vertical axis and performance on the horizontal axis. Efficiency may be measured in a variety of ways (e.g. performance/watt). Performance may be measured using various benchmark programs such as Specint, SpecFlt, Dhrystone, etc. Various PStates for the processor 32A are illustrated along the curves in FIG. 2. PStates that corresponding to higher performance are on the PCore curve, since the PCore is optimized for performance, wherein the PStates corresponding to lower performance/higher energy conservation are on the ECore curve, which is more efficient at lower performance levels but less performant at higher performance levels.

Accordingly, in the example of FIG. 2, the PStates 1, 2, and 3 are mapped to the ECore 42 and the PStates 4, 5, 6, and 7 are mapped to the PCore 40. Any number of PStates may be supported and any number may be mapped to various cores. In another embodiment, continuous PState settings may be supported. In such an embodiment, a break over point where the curves intersect in FIG. 2 may be defined at which a core switch may occur.

Figure 3:
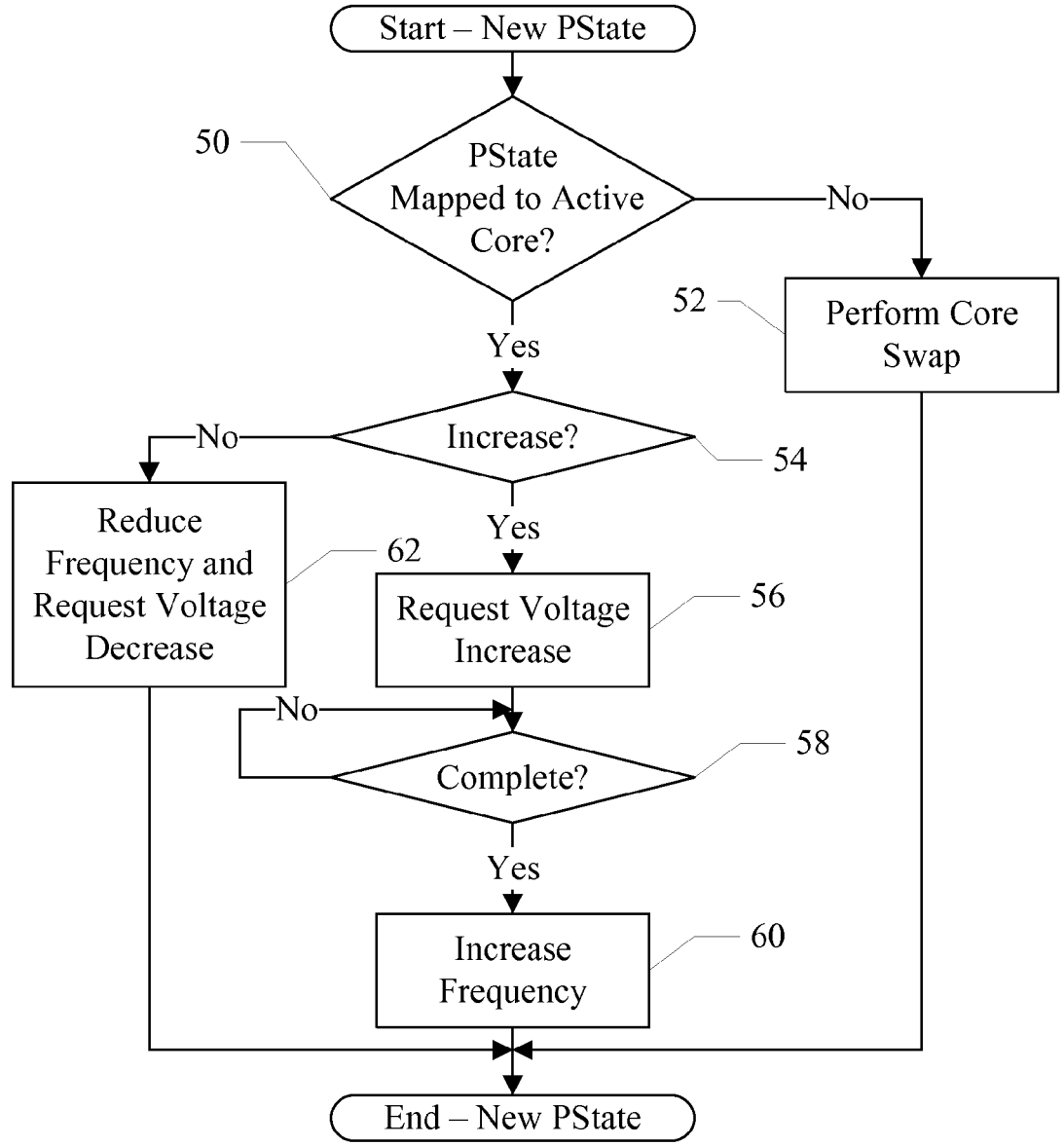
FIG. 3 is a flowchart illustrating operation of one embodiment of a processor power management unit to change processor states.

FIG. 3 is a flowchart illustrating one embodiment of operation of the processor power manager 36 in response to a new PState written to the PState register 38. While the blocks are shown in a particular order for ease of understanding, other orders may be used. Blocks may be performed in parallel in combinatorial logic in the processor power manager 36. Blocks, combinations of blocks, and/or the flowchart as a whole may be pipelined over multiple clock cycles. The processor power state manager 36 may be configured to implement the operation shown in FIG. 3.

The active core may be the core 40/42 which is currently executing code. In some embodiments, the active core may be the only core that is powered on during steady state operation at the current PState. If the new PState is not mapped to the active core (decision block 50, "no" leg), the processor power state manager 36 may perform a "core swap" to the core to which the new PState is mapped (block 52). If the new PState is mapped to the active core, the active core may remain active and execution may continue while the PState is changed. If the new PState is an increase from the current PState (decision block 54, "yes" leg), the supply voltage magnitude may be increased first to support the increased frequency. Thus, the processor power state manager 36 may request the voltage increase (block 56) and wait for the voltage increase to complete (decision block 58, "yes" leg). The processor power state manager 36 may determine that voltage increase is complete by waiting for a specified period of time, or may receive a communication that indicates when the voltage increase is complete. In an embodiment, the processor power state manager 36 may transmit the voltage increase request to another power manager (e.g. an SOC level power manager shown in FIG. 6, in one embodiment) or may transmit the voltage request directly to a PMU that supplies the voltage. Once the voltage increase is complete, the processor power manager 36 may increase the frequency of the clock (block 60). On the other hand, if the new PState is a decrease from the current PState, the current supply voltage may support the new (lower) frequency. Thus (decision block 54, "no" leg), the processor power manager 36 may update the clock frequency and request the new supply voltage without waiting for the voltage change to complete (block 62).

Figure 4:
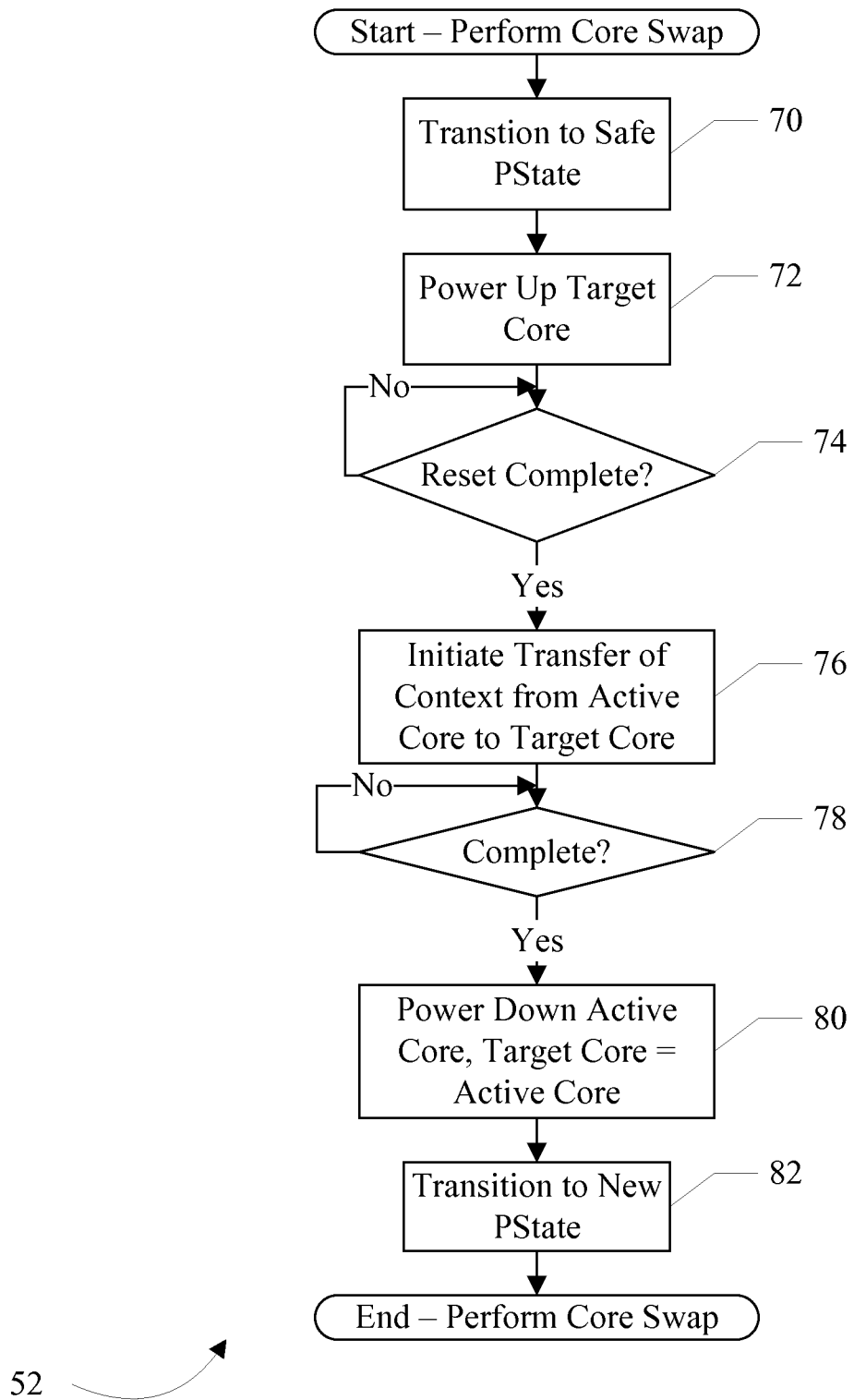
FIG. 4 is a flowchart illustrating operation of one embodiment of the processor power management unit to swap cores.

FIG. 4 is a flowchart illustrating one embodiment of operation of the processor power manager 36 to perform a core swap (block 52 from FIG. 3). While the blocks are shown in a particular order for ease of understanding, other orders may be used. Blocks may be performed in parallel in combinatorial logic in the processor power manager 36. Blocks, combinations of blocks, and/or the flowchart as a whole may be pipelined over multiple clock cycles. The processor power state manager 36 may be configured to implement the operation shown in FIG. 4.

The processor power manager 36 may transition the active core to a "safe" PState (block 70). The safe PState may be a state at which both the active core and the target core operate correctly. In this context, the target core may be the core to which the new PState is mapped. In embodiments in which there are more than two cores, the safe PState may be different depending on which cores are the active and target cores. The safe PState need not be a PState that is selectable in the PState register 38. That is, the combination of supply voltage and frequency may not be one of the supported combinations that are mapped to the cores. For example, the PCore may be capable of running at a higher frequency given the supply voltage magnitude in the safe PState. However, the ECore may not be capable of running at the higher frequency with the given supply voltage magnitude. Thus, a safe PState could include the current supply voltage magnitude but a lower clock frequency. Alternatively, the target core may not support the current supply voltage, and the safe PState may include different supply voltage magnitude and clock frequency. Transitioning to the safe PState may be similar to blocks 54, 56, 58, 60, and 62 in FIG. 3.

The processor power manager 36 may power up the target core (block 72). For example, in the embodiment of FIG. 1, the processor power manager 36 may close the power switches to the target core, allowing power to flow to the target core. The target core may be reset after power has stabilized. In some embodiments, the target core may initialize after reset is complete. Once reset (and initialization, if applicable) is complete (decision block 74, "yes" leg), the processor power manager 36 may initiate a transfer of the processor context from the active core to the target core (block 76). In an embodiment, the cores may include circuitry configured to transmit/receive the processor context. In another embodiment, the circuitry may be in the processor power manager 36. As mentioned previously, the cores may also be configured to flush the caches during the context transfer. Once the context transfer is complete (decision block 78, "yes" leg), the processor power manager may power down the (previously) active core and the target core may become the active core (block 80). The powering down may be accomplished, e.g. by opening the power switches to the previously active core. The processor power manager 36 may transition the active core to the new PState (block 82). Transitioning to the new PState may be similar to blocks 54, 56, 58, 60, and 62 in FIG. 3.

Figure 5:
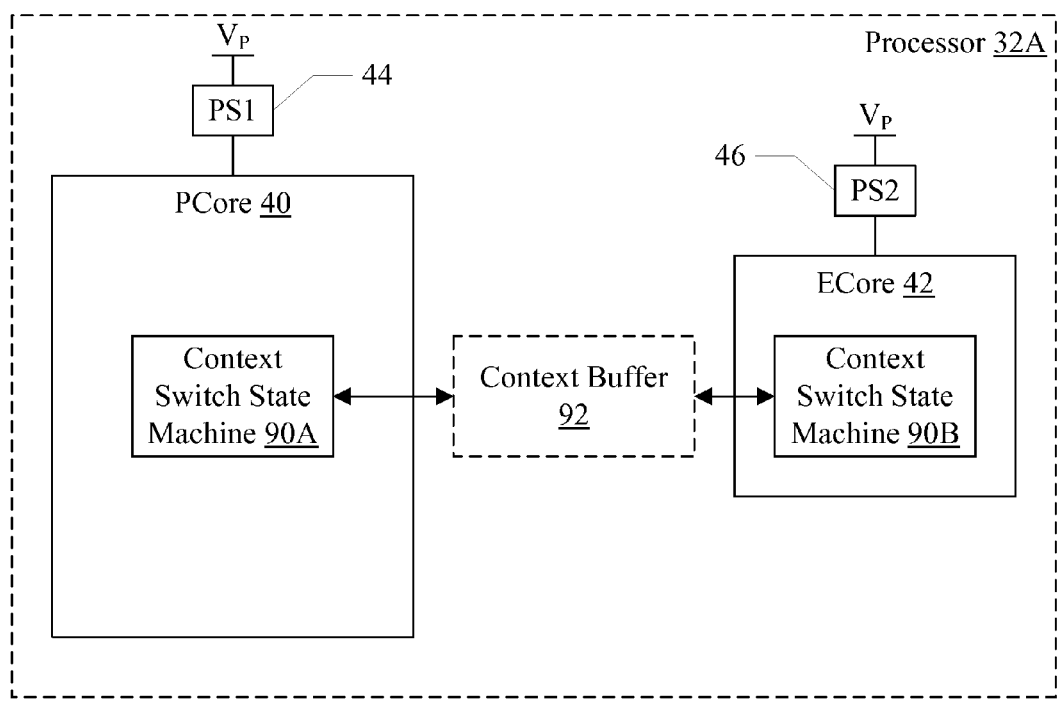
FIG. 5 is a block diagram of one embodiment of context switching hardware for a core swap.

FIG. 5 is a block diagram of one embodiment of the processor 32A in greater detail. In the illustrated embodiment, the PCore 40 and ECore 42 are shown including instances of a context state machine 90 (i.e. 90A and 90B in FIG. 5). The implementations of the state machine 90 in the cores 40 and 42 may differ, but they may logically operate in a similar fashion. Generally, the state machine 90 in the active core may cause register state to be output by the active core to a context buffer 92 to which the state machines 90 are coupled. The order of the registers in the state may be fixed, so that the receiving state machine may simply read the data and write it to the correct registers. In another implementation, the order may be arbitrary and each register may be assigned an identifier which may be written, with the register contents, to the context buffer 92 and used by the receiving state machine to write the correct register within the receiving core.

The state machine may be implemented in a variety of fashions: fixed function circuitry (e.g. a finite state machine), microcode executed by the processor, in the processor power manager 36 (e.g. transmitting commands to the cores to transfer various registers), etc. Additionally, the state machine 90 in the active processor may flush the data cache(s) to the L2 cache 34, as mentioned above.

The context buffer 92 may be a first in, first out buffer (FIFO) to capture context state from one core to another. The context buffer 92 may provide elasticity, handle clock domain crossings, etc. In an embodiment, the context buffer 92 may be part of the processor power manager 36 and thus is shown in dotted lines in FIG. 5. The state machines 90 may also be implemented in the processor power manager 36 in another embodiment. In such embodiments, the processor power manager 36 may have access to the register state in the cores 40 and 42, or may cause instructions to be executed to perform the register reads/writes to perform the transmission of the register states.

Figure 6:
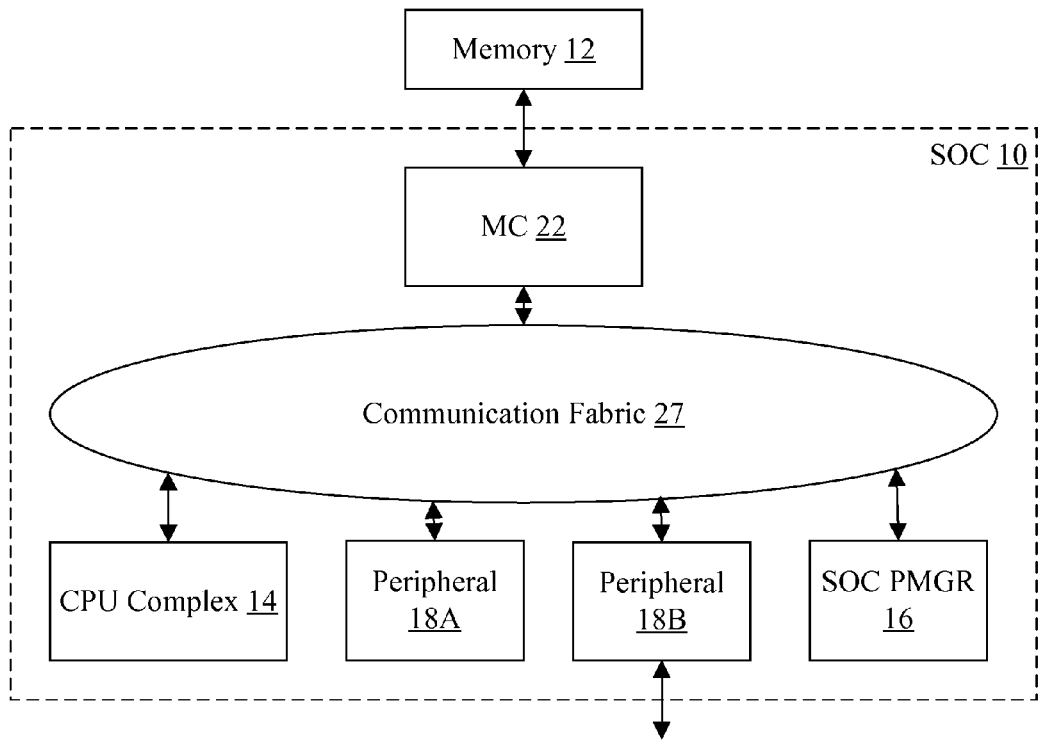
FIG. 6 is a block diagram of one embodiment of a system on a chip (SOC) including one embodiment of the processor cluster shown in FIG. 1.

FIG. 6 is a block diagram of one embodiment of an SOC 10 coupled to a memory 12. As implied by the name, the components of the SOC 10 may be integrated onto a single semiconductor substrate as an integrated circuit "chip." In some embodiments, the components may be implemented on two or more discrete chips in a system. However, the SOC 10 will be used as an example herein. In the illustrated embodiment, the components of the SOC 10 include a central processing unit (CPU) complex 14 (which may be implemented by the processor cluster 30 shown in FIG. 1), peripheral components 18A-18B (more briefly, "peripherals" 18), a memory controller 22, an SOC power manager (PMGR) 16, and a communication fabric 27. The components 14, 16, 18A-18B, and 22 may all be coupled to the communication fabric 27. The memory controller 22 may be coupled to the memory 12 during use.

The memory controller 22 may generally include the circuitry for receiving memory operations from the other components of the SOC 10 and for accessing the memory 12 to complete the memory operations. The memory controller 22 may be configured to access any type of memory 12. For example, the memory 12 may be static random access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g. LPDDR, mDDR, etc.). The memory controller 22 may include queues for memory operations, for ordering (and potentially reordering) the operations and presenting the operations to the memory 12. The memory controller 22 may further include data buffers to store write data awaiting write to memory and read data awaiting return to the source of the memory operation. In some embodiments, the memory controller 22 may include a memory cache to store recently accessed memory data. In SOC implementations, for example, the memory cache may reduce power consumption in the SOC by avoiding reaccess of data from the memory 12 if it is expected to be accessed again soon. In some cases, the memory cache may also be referred to as a system cache, as opposed to private caches such as the L2 cache or caches in the processors, which serve only certain components. Additionally, in some embodiments, a system cache need not be located within the memory controller 22.

The peripherals 18A-18B may be any set of additional hardware functionality included in the SOC 10. For example, the peripherals 18A-18B may include video peripherals such as an image signal processor configured to process image capture data from a camera or other image sensor, display controllers configured to display video data on one or more display devices, graphics processing units (GPUs), video encoder/decoders, scalers, rotators, blenders, etc. The peripherals may include audio peripherals such as microphones, speakers, interfaces to microphones and speakers, audio processors, digital signal processors, mixers, etc. The peripherals may include interface controllers for various interfaces external to the SOC 10 (e.g. the peripheral 18B) including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

The communication fabric 27 may be any communication interconnect and protocol for communicating among the components of the SOC 10. The communication fabric 27 may be bus-based, including shared bus configurations, cross bar configurations, and hierarchical buses with bridges. The communication fabric 27 may also be packet-based, and may be hierarchical with bridges, cross bar, point-to-point, or other interconnects.

The SOC PMGR 16 may be configured to control the supply voltage magnitudes requested from the PMU in the system. There may be multiple supply voltages generated by the PMU for the SOC 10. For example, the $V_P$ voltage may be generated for the processors 32A-32n in the CPU complex 14, and a $V_{SOC}$ voltage may be generated for other components in the SOC 10. In an embodiment, $V_{SOC}$ may serve the memory controller 22, the peripherals 18, the SOC PMGR 16, and the other components of the SOC 10 and power gating may be employed based on power domains. There may be multiple supply voltages for the rest of the SOC 10, in some embodiments. In some embodiments, there may also be a memory supply voltage for various memory arrays in the CPU complex 14 and/or the SOC 10. The memory supply voltage may be used with the voltage supplied to the logic circuitry (e.g. $V_P$ or $V_{SOC}$), which may have a lower voltage magnitude than that required to ensure robust memory operation. The SOC PMGR 16 may be under direct software control (e.g. software may directly request the power up and/or power down of components) and/or may be configured to monitor the SOC 10 and determine when various components are to be powered up or powered down. For the CPU complex 14, the voltage requests for $V_P$ may be provided to the SOC PMGR 16, which may communicate the requests to the PMU to effect the change in supply voltage magnitudes.

Generally, a component may be referred to as powered on or powered off. The component may be powered on if it is receiving supply voltage so that it may operate as designed. If the component is powered off, then it is not receiving the supply voltage and is not in operation. The component may also be referred to as powered up if it is powered on, and powered down if it is powered off. Powering up a component may refer to supplying the supply voltage to a component that is powered off, and powering down the component may refer to terminating the supply of the supply voltage to the component. Similarly, any subcomponent and/or the SOC 10 as a whole may be referred to as powered up/down, etc. A component may be a predefined block of circuitry which provides a specified function within the SOC 10 and which has a specific interface to the rest of the SOC 10. Thus, the peripherals 18A-18B, the CPU complex 14, the memory controller 22, and the SOC PMGR 16 may each be examples of a component.

It is noted that the number of components of the SOC 10 (and the number of subcomponents for those shown in FIG. 1, such as within the CPU complex 14) may vary from embodiment to embodiment. There may be more or fewer of each component/subcomponent than the number shown in FIG. 1.

Figure 7:
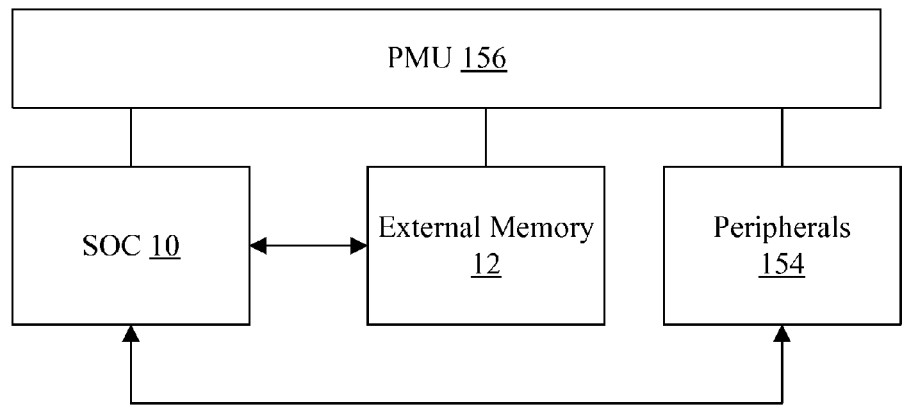
FIG. 7 is a block diagram of one embodiment of a system.

Turning next to FIG. 7, a block diagram of one embodiment of a system 150 is shown. In the illustrated embodiment, the system 150 includes at least one instance of the SOC 10 coupled to one or more peripherals 154 and the external memory 12. The PMU 156 is provided which supplies the supply voltages to the SOC 10 as well as one or more supply voltages to the memory 12 and/or the peripherals 154. In some embodiments, more than one instance of the SOC 10 may be included (and more than one memory 12 may be included as well).

The PMU 156 may generally include the circuitry to generate supply voltages and to provide those supply voltages to other components of the system such as the SOC 10, the memory 12, various off-chip peripheral components 154 such as display devices, image sensors, user interface devices, etc. The PMU 156 may thus include programmable voltage regulators, logic to interface to the SOC 10 and more particularly the SOC PMGR 16 to receive voltage requests, etc.

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 12 may include any type of memory. For example, the external memory 12 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 12 may include one or more memory modules to which the memory devices are mounted, such as single inline memory modules (SIMMs), dual inline memory modules (DIMMs), etc. Alternatively, the external memory 12 may include one or more memory devices that are mounted on the SOC 10 in a chip-on-chip or package-on-package implementation.

Numerous variations and modifications will become apparent to those skilled in the art once the above disclosure is fully appreciated. It is intended that the following claims be interpreted to embrace all such variations and modifications.

What is claimed is:

1. A processor apparatus comprising:
   a plurality of processor cores corresponding to a processor, wherein at least one of the processor cores implements a respective design having different efficiency/performance characteristics from another one of the processor cores, and wherein at most one of the plurality processor cores is actively executing instructions at a given point in time from code assigned to the processor by an operating system for execution in the processor; and a processor power manager coupled to the plurality of processor cores, wherein the processor power manager includes a processor state register that is programmable with a plurality of processor states, wherein each of the plurality of processor states specifies a different combination of a voltage and a clock frequency at which the processor corresponding to the plurality of processor cores is to operate, and wherein each particular processor state of the plurality of processor states maps to one of the plurality of processor cores that has a higher efficiency/performance characteristic at the particular processor state than other ones of the plurality of processor cores; and the plurality of processor cores and the processor power manager are configured, automatically and invisible to the operating system, using a plurality of control circuits in the plurality of processor cores and the processor power manager, to transfer a processor context of the processor from a first processor core of the plurality of processor cores to which a current processor state is mapped to a second processor core of the plurality of processor cores to which a requested processor state is mapped in response to the operating system programming the processor state register in the processor power manager with the requested processor state to transition the processor from the current processor state to the requested processor state, wherein a first control circuit of the plurality of control circuits and a second control circuit of the plurality of control circuits participate in the transfer, and wherein the first control circuit is in the first processor core and the second control circuit is in the second processor core.

2. The processor apparatus as recited in claim 1 wherein the processor power manager is configured to power on the second processor core and power down the first processor core responsive to transferring the processor context to the second processor core.

3. The processor apparatus as recited in claim 2 wherein the processor power manager is configured to change an operating point of the second processor core to a second operating point specified by the second processor state.

4. The processor apparatus as recited in claim 1 wherein the processor power manger is configured to change a current operating point specified by the current processor state to a third operating point specified by a third processor state responsive to the processor power manager being programmed to the third processor state, wherein the third processor state is mapped to the first processor core.

5. The processor apparatus as recited in claim 1 wherein the plurality of processing cores comprise a context switch state machine configured to cooperate with the context switch state machines of other processing cores of the plurality of processing cores to transfer the processor context.

6. The processor apparatus as recited in claim 5 further comprising a buffer coupled to the context switch state machines and configured to receive the processor context from the first processor core and provide the processor context to the second processor core.

7. The processor apparatus as recited in claim 1 wherein the processor apparatus comprises a second plurality of processor cores forming one or more additional processors, wherein the processor and the one or more additional processors are a plurality of processors.

8. The processor apparatus as recited in claim 7 further comprising a cache coupled to the plurality of processors and shared by the plurality of processors, wherein transferring the context comprises flushing at least modified data from the first processor core to the cache.

9. The processor apparatus as recited in claim 1 wherein the processor power manager is configured to change the operating point of the first processor core to a third operating point at which the second processor core is also configured to operate prior to transferring the processor context.

10. The processor apparatus as recited in claim 9 wherein the processor power manager is configured to change the operating point of the second processor core to the requested processor state subsequent to transferring the processor context.

11. An integrated circuit comprising:
a central processing unit (CPU) complex comprising:
a plurality of CPU processors, each of the CPU processors having a plurality of dissimilar processor cores, wherein, at a given point in time in each of the CPU processors that is enabled, one of the plurality of dissimilar processor cores is actively executing instructions from code assigned to the CPU processor by an operating system for execution in the CPU processor; and
a processor power manager including a processor state register, wherein the processor power manager is configured to manage transitions between the plurality of dissimilar processor cores, automatically and invisible to the operating system, using a plurality of control circuits in the plurality of dissimilar processor cores, responsive to the operating system programming a processor state into the processor state register in the processor power manager and the programmed processor state is mapped to one of the plurality of dissimilar processor cores and a current processor state is mapped to a different one of the plurality of dissimilar processor cores, wherein the current processor state is in effect at a time that the operating system programs the processor state register with the programmed processor state, and wherein each processor state programmable into the processor state registers specifies a different combination of a voltage and a clock frequency at which the plurality of CPU processors are to operate, and wherein each particular processor state is mapped to one of the plurality of dissimilar processor cores that has a higher efficiency/performance characteristic at the particular processor state than other ones of the plurality of dissimilar processor cores, wherein a first control circuit of the plurality of control circuits and a second control circuit of the plurality of control circuits participate in a transition from a first processor core of the plurality of processor cores to a second processor core of the plurality of processor cores, and wherein the first control circuit is in the first processor core and the second control circuit is in the second processor core; and
a second power manager coupled to the CPU complex and configured to interface to a power management unit to request supply voltage magnitudes for the integrated circuit, wherein the processor power manager is configured to transmit a supply voltage magnitude request to the second power manager to request from the power management unit responsive to a change in the processor state.

12. The integrated circuit as recited in claim 11 wherein the CPU complex further comprises a cache to which the plurality of CPU processors are coupled.

13. The integrated circuit as recited in claim 12 wherein an active core of the plurality of dissimilar processor cores for a first CPU processor of the plurality of CPU processors is configured to flush at least modified data to the cache in response to a transition between the plurality of dissimilar processor cores.

14. The integrated circuit as recited in claim 11 wherein each processor core of the plurality of dissimilar processor cores has at least two processor states mapped to that processor core.

15. The integrated circuit as recited in claim 11 wherein the transition includes transmitting a processor context from an active processor core of the plurality of dissimilar processor cores to a second processor core of the plurality of dissimilar processor cores to which execution is being transferred.

16. The integrated circuit as recited in claim 15 wherein the processor power manager is configured to cause a powering up the second processor core prior to transmission of the processor context.

17. The integrated circuit as recited in claim 16 wherein the processor power manager is configured to cause a powering down the active processor core responsive to completing transmission of the processor context, and wherein the second processor core becomes the active processor core.

18. The integrated circuit as recited in claim 11 wherein each of the plurality of dissimilar processor cores is configured to execute any given instruction sequence in a same manner as each other one of the plurality of dissimilar processor cores.

19. A method comprising:
  detecting a change to a first operating point of a first processor that includes a plurality of processor cores, wherein the change is detected during a time that a first processor core of the plurality of processor cores is operating at a second operating point that is mapped to the first processor core, wherein the first operating point is mapped to a second processor core of the plurality of processor cores, the change responsive to an operating system programming a processor state for the first processor into a processor state register in a processor power manager, wherein the first operating point specifies a first voltage and a first clock frequency that are respectively different from a second voltage and a second operating frequency specified by the second operating point, and wherein each particular operating point is mapped to one of the plurality of processor cores that has a higher efficiency/performance characteristic at the particular operating point than other ones of the plurality of processor cores, wherein, at a given point in time, at most one of the plurality of processor cores is actively executing instructions from code assigned to the first processor by the operating system for execution in the first processor; and
  responsive to the detecting, transmitting, automatically and invisible to the operating system, using a plurality of control circuits in the plurality of processor cores, a context of the first processor from the first processor core to the second processor core, wherein the transmitting is performed using a first control circuit of the plurality of control circuits and a second control circuit of the plurality of control circuits, wherein the first control circuit is in the first processor core and the second control circuit is in the second processor core.

20. The method as recited in claim 19 further comprising:
powering on the second processor core responsive to the detecting; and
powering off the first processor core subsequent to the transmitting.

* * * * *